US007085270B2

(12) United States Patent
Inouchi et al.

(10) Patent No.: US 7,085,270 B2
(45) Date of Patent: Aug. 1, 2006

(54) ADDRESS TRANSLATION METHOD

(75) Inventors: Hidenori Inouchi, Higashimurayama (JP); Yukiko Takeda, Tokorozawa (JP); Masaya Hayashi, Kawasaki (JP); Keisuke Takeuchi, Yokohama (JP); Takamitsu Senou, Kamiyabe (JP)

(73) Assignee: Hitachi, Ltd., Tokyo (JP)

( * ) Notice: Subject to any disclaimer, the term of this patent is extended or adjusted under 35 U.S.C. 154(b) by 953 days.

(21) Appl. No.: 10/061,331

(22) Filed: Feb. 4, 2002

(65) Prior Publication Data

US 2003/0048804 A1    Mar. 13, 2003

(30) Foreign Application Priority Data

Sep. 11, 2001    (JP) .............................. 2001-274419

(51) Int. Cl.
*H04L 12/28* (2006.01)

(52) U.S. Cl. ...................................... 370/392; 370/466

(58) Field of Classification Search ................ 370/392, 370/466, 389, 401–404

See application file for complete search history.

(56) References Cited

U.S. PATENT DOCUMENTS 6,038,233 A * 3/2000 Hamamoto et al. ......... 370/401

(Continued)

FOREIGN PATENT DOCUMENTS

EP    1 087 575 A1    9/1999

OTHER PUBLICATIONS

Tsirtsis et al., "RFC 2766: Network Address Translation—Protocol Translation (NAT-PT)", Feb. 2000, pp. 1-21.*

(Continued)

*Primary Examiner*—Chau Nguyen
*Assistant Examiner*—Jung Park
(74) *Attorney, Agent, or Firm*—Reed Smith LLP; Stanley P. Fisher, Esq.; Juan Carlos A. Marquez, Esq.

(57) ABSTRACT

A translator includes a unit for communication with a DNS-ALG. The DNS-ALG detects a DNS query to a destination terminal, and performs once translation to IPv6. The DNS-ALG translates a destination temporary IPv6 address, in which a real address of IPv4 acquired from a DNS server of the destination terminal is added with a virtual IPv6 prefix, to a destination temporary IPv4. The IPv6-based DNS-ALG cooperates with the translator to permit alleviation of processing load on the DNS-ALG and reduction in capacity of a translation table of large capacity. A technique is disclosed which, with the above construction, can permit mutual connection among a plurality of VPN's without exchanging the existing VPN's.

22 Claims, 18 Drawing Sheets

U.S. PATENT DOCUMENTS 6,118,784 A * 9/2000 Tsuchiya et al. ............ 370/401
2003/0193965 A1* 10/2003 Higuchi et al. ............. 370/466

OTHER PUBLICATIONS

Srisuresh et al., "RFC: 2694: DNS extensions to Network Address Translators (DNS-ALG)", Sep. 1999, pp. 1-29.*

Tsirtsis et al., "Network Address Translation—Protocol Translation (Nat-pt)", Retrived From the Internet, Feb. 28, 2000, pp. 1-21.

P. Srisuresh and M. Holdrege, "IP Network Address Translator (NAT) Terminology and Considerations", Aug. 1999, pp. 1-24.

P. Srisuresh, G. Tsirtsis, P. Akkiraju and A. Heffrnan, "DNS Extensions to Network Address Translators (DNS_ALG)", Sep. 1999, pp. 1-23.

G. Tsirtsis and P. Srisuresh, "Network Address Translation—Protocol Translation (NAT-PT)", Feb. 2000, pp. 1-17.

E, Nordmark, "Stateless IP/ICMP Translation Algorithm (SIIT)", Feb. 2000, pp. 1-21.

H. Kitamura, "A SOCKS-based Ipv6/Ipv4 Gateway Mechanism", Apr. 2001, pp. 1-9.

Internet RFC Dictionary published by ASCII, 1998, pp. 323-329.

* cited by examiner

FIG. 9

300 VIRTUAL PREFIX MANAGEMENT TABLE

| CIRCUIT NUMBER | VIRTUAL PREFIX | POINTER |
|---|---|---|
| xxx | α | p1 |
| xxy | β | p2 |
| ⋮ | | |

310 VIRTUAL PREFIX MANAGEMENT TABLE

| LAYER TWO INFORMATION | VPN IDENTIFIER | VIRTUAL PREFIX |
|---|---|---|
| aaa | 1 | α |
| bbb | 2 | β |
| ⋮ | | |

500 TRANSLATION INFORMATION TABLE

510 TRANSLATION INFORMATION TABLE FOR VPN#1

| V4 ADDRESS (501) | V6 ADDRESS (502) | |
|---|---|---|
| b' | $\beta + b$ | 510-1 |
| c' | $\gamma + c$ | 510-2 |
| ⋮ | | 510-n |

520 TRANSLATION INFORMATION TABLE FOR VPN#2

| V4 ADDRESS (501) | V6 ADDRESS (502) | |
|---|---|---|
| a' | $\alpha + a$ | 520-1 |
| | | |
| ⋮ | | 520-n |

530 TRANSLATION INFORMATION TABLE FOR VPN#3

| V4 ADDRESS (501) | V6 ADDRESS (502) | |
|---|---|---|
| a1' | $\alpha + a$ | 530-1 |
| | | |
| ⋮ | | 530-n |

FIG. 21

320 VPN MANAGEMENT TABLE

| LAYER TWO INFORMATION 321 | VPN IDENTIFIER 322 | CIRCUIT NUMBER 323 | |
|---|---|---|---|
| aaa | 1 | xxx | 320-1 |
| bbb | 2 | yyy | 320-2 |
| ⋮ | | | 320-n |

ADDRESS TRANSLATION METHOD

BACKGROUND OF THE INVENTION

The present invention relates to techniques of mutually connecting networks conforming to the same protocol or networks conforming to different protocols.

For example, a method of using Twice NAT (Network Address Translation) (see http://www.ietf.org/rfc/rfc2663.txt, pp. 12–13) or a method of using a tunnel technique (see http://www.ietf.org/rfc/rfc2663.txt, p. 22) has been known as a technique of mutually connecting private networks through Internet to exhibit them as one VPN (Virtual Private Network). In any method, header information of an IP packet based on IPv4 and that of an IP packet also based on IPv4 are mutually translated in essentiality.

For example, in the basic NAT, translation between a private IPv4 address and a public IPv4 address is carried out. A router implementing a so-called Twice NAT technique in which two of NAT are connected in series is called a Twice NAT router. In the conventional basic NAT and bi-directional NAT, either one of source and destination addresses is rewritten, but in the Twice NAT technique, both the source address and destination address are rewritten at the time that a datagram passes through two domains connected by the Twice NAT router.

The Twice NAT is frequently used when an address space inside a private network collides with an address space of public space. In case a site is erroneously addressed by a public address of another site, even after a user given an address from a provider has transferred to another provider, the user continues to use the address assigned from the former provider for a while, and the latter provider assigns the same address to another user, resulting in generation of an address collision. To solve the address collision, the Twice NAT operates as follows. When a Host-A in the private domain starts communication with a Host-X in the public domain, the Host-A sends a DNS address query packet for the Host-X. A DNS-ALG (Domain Name Service-Application Level Gateway) captures this packet, translates the address for the Host-X to an address routable inside the private domain (Host-XPRIME), and returns it to the Host-A. When the DNS address resolution ends, the Host-A starts communication with the Host-XPRIME. At the time that this packet passes through the Twice NAT, the source address is rewritten to an address owned by the NAT, and the destination address is rewritten to the Host-X. A return packet from the Host-X is translated similarly to the above. Details of operation of the DNS-ALG are described in http://www.ietf.org/rfc/rfc2694.txt.

The method using the Twice NAT needs a translation table of large capacity when a great number of hosts communicate with each other through Internet. In case many applications use a specified IP address, there arises a problem that the dynamic address translation by the NAT using the DNS address query as a trigger, described as above, cannot fulfill itself. To solve this problem, apart from the NAT technique, there is available a method of mutually connecting two domains by using the tunnel technique. The method using the tunnel technique is restrained by such a condition that if terminals inside two networks being objects to be connected have the same address, communication cannot be permitted between the terminals having the same address, and two different domains to be connected must have the same subnet. However, there is no need of having the translation table of large capacity required during the use of the Twice NAT, and hence the tunnel technique is frequently used as a technique of mutually connecting private VLAN's (Virtual LAN's) sharing the same subnet space through Internet.

Each of the above-described examples is a technique used when a communication protocol of a network to which a terminal belongs is the same as that of a network to which a communication partner terminal belongs. When a communication protocol of a network to which a terminal belongs differs from that of a network to which a communication partner terminal belongs, NAT-PT (see http://www.ietf.org/rfc/rfc2766.txt, pp. 6–18, and http://www.ietf.org/rfc/rfc2765.txt, pp. 9–22) and SOCKS64 (see http://www.ietf.org/rfc3089.txt), for instance, have been known as a translation technique of connecting a network using, for example, IPv4 as protocol (hereinafter referred to as an "IPv4 network") and a network using, for example, Internet Protocol version 6 as protocol (hereinafter referred to as an "IPv6 network").

Essentially, in either method, the format of IP packet is mutually translated between IPv4 and IPv6. For example, a translation between IPv4 address and IPv6 address is carried out. A unit for performing this translation will hereinafter be called a "translator". In the translator, for the sake of translation, correspondence relation between IPv4 address and IPv6 address must be prepared and held in advance of translation. When the correspondence relation is prepared dynamically each time that communication occurs, name resolution of DNS (Domain Name System) is used as a trigger for the preparation (see Internet RFC dictionary, published by ASCII, pp. 323–329).

The DNS is a system for translating a name (character string) comprehensible to human such as a URL of Web to an IP address. Operation to translate the name to the IP address will hereinafter be called "name resolution". Today, almost all the applications on Internet acquire an IP address of a communication partner by utilizing this DNS.

The NAT and the translator take advantage of this fact, and constantly monitor messages of DNS interchanged upon commencement of communication to take a change of preparing translation information (such as the correspondence relation to IP address) of a request message for name resolution. Specifically, when an IPv6 terminal performs name resolution for a certain name and an IP address responsive thereto is based on IPv4, this IPv4 address is rewritten to an IPv6 address which in turn is returned to the IPv6 terminal. Then, the correspondence between the IPv4 address before rewriting and the rewritten IPv6 address is made. In other words, the DNS-ALG intercepts the response message for name resolution to rewrite it, and prepares translation information on the basis of information before rewriting and information after rewriting. The translation information dynamically prepared in this phase is temporary, and is discarded when the communication ends. The correspondence relation between IPv4 address and IPv4 address or the correspondence relation between IPv4 address and IPv6 address which is held by the DNS-ALG is discarded when the communication ends, and correspondence relation that differs communication by communication is used. Namely, the contents of rewrite of the response message for name resolution differ communication by communication. Accordingly, as viewed from the terminal making a request for name resolution, a different IP address is acquired for the same name.

As will be seen from the above, under conditions that almost all the applications on Internet dynamically acquire an IP address of a communication partner by utilizing the DNS, the cooperation of the DNS-ALG with the translator is a technique indispensable for connecting the IPv6 network and the IPv4 network. Further, the cooperation of the DNS-ALG with the Twice NAT is a technique for solving the IPv4 private address collision problem caused during transfer to the public address.

As described above, the mutual connection of VPN's based on the tunnel method faces a problem that it cannot deal with collision of IP addresses. The cooperation of the DNS-ALG with the Twice NAT is the technique for solving the IPv4 private address collision problem caused during transfer to the public address. In the cooperation of the DNS-ALG with the Twice NAT, however, there are problems that the address translation table is large, and that it is not scalable. Generally, the mutual connection between VPN's is often implemented by arranging the DNS-ALG and the Twice NAT in the edge of VPN. But, as the number of VPN's to be mutually connected increases, the address translation table becomes large. As a result, there is a problem that presentation of service is difficult to achieve.

SUMMARY OF THE INVENTION

An object of the present invention is to permit mutual communication between two terminals even when, under a condition that a communication protocol of a network to which a terminal belongs is the same as that of a network to which a communication partner terminal belongs, address spaces of both the networks collide with each other.

Another object of the invention is to provide a scalable and practical address translation unit that permits mutual communication between two terminals through basic translation when a communication protocol of a network to which a terminal belongs differs from that of a network to which a communication partner terminal belongs.

According to the invention, through cooperation of the IPv6 based DNS-ALG with the Twice NAT-PT, the processing load imposed on the DNS-ALG for generating a temporary address for a destination terminal can be alleviated, and the large-capacity translation table can be reduced in capacity. The processing load and the large-capacity translation table are needed when translation information necessary for address translation based on the conventional Twice NAT is dynamically prepared.

When a provider manages the IPv6 based DNS-ALG and the Twice NAT-PT according to the invention collectively and a translator accommodates a plurality of VPN's, mutual connection among the plurality of VPN's can be ensured without exchanging the existing VPN's.

According to the invention, in addition to the conventional protocol translation technique represented by the NAT-PT, at least two means as below are provided. More particularly, (1) a DNS-ALG unit is provided which manages translation information necessary for address translation represented by correspondence relation between IPv4 address and IPv6 address, and which is owned by a plurality of translators, and (2) each translator includes a protocol necessary for each translator to communicate with the DNS-ALG unit.

In order to dynamically prepare translation information necessary for address translation based on the Twice NAT-PT, the DNS-ALG unit once translates a DNS query, which is sent from a source terminal to a destination terminal, to IPv6 inside the unit. The DNS-ALG unit uses, as a temporary IPv6 address for the destination terminal, an IPv6 address in which a real address of IPv4 acquired through a query by a destination IPv4DNS server is added with a virtual IPv6 prefix. The temporary IPv6 address is translated to a temporary IPv4 address which in turn is noticed to the source terminal. By adopting this method, the number of translation operations can be reduced by one and at the same time the size of the translation table can be reduced in comparison with the conventional Twice NAT method. Further, (3) each translator may include means for performing protocol translation by utilizing L2 (layer two) information. By providing means for performing protocol translation by using L2 information represented by MAC address other than IP address, a plurality of VPN's can be multiplexed on one physical circuit.

An information network applied with the invention as above includes a first network, a second network communicable with the first network, a third network communicable with the second network, a first address translation unit for connecting the first and second networks, and a second address translation unit for connecting the second and third networks, the first address translation unit sends a first temporary address, in which an address used in the first network is added with a prefix indicative of the first network, to the second address translation unit through the second network, and the second address translation unit translates the first temporary address to a second temporary address representing an address not used in the third network so as to send the second temporary address to the third network, and stores correspondence information between the first and second temporary addresses. The second temporary address sent from the third network is translated to the first temporary address on the basis of the correspondence information, the prefix is deleted from the first temporary address, and the first temporary address is sent to the first network. In this case, the first network may conform to a first protocol, and the second and third networks may conform to a second protocol. The address to be translated may be either a source address or a destination address.

A communication apparatus used in the networks as above is one interposed between the first and second networks to intervene in communication between the first and second networks, and operative to receive an original address sent from the first network and used therein, to form a first temporary address in which the original address is added with a prefix, to send the first temporary address to the second network, to receive the first temporary address sent from the second network, to form the original address by deleting the prefix from the first temporary address, and to send the original address to the first network.

Another communication apparatus translates a first address, which is sent from a second network, to a second address not used in a first network, sends the second address to the first network, holds the relation between the first and second addresses as translation information, translates the second address, which is sent from the first network, to the first address on the basis of the translation information, and sends the first address to the second network.

BRIEF DESCRIPTION OF THE DRAWINGS

FIG. 9 is a table diagram of a virtual prefix management table provided for the translator 1:

FIG. 10 is a table diagram of a virtual prefix management table provided for the translator 1 in a fifth embodiment of the invention;

FIG. 11 is a table diagram of a translation information table provided for the translator 1;

FIG. 21 is a table diagram of a VPN management table provided for the L2SW 7 in the fourth embodiment of the invention.

DETAILED DESCRIPTION OF THE EMBODIMENTS

A first embodiment of the present invention will be described with reference to the accompanying drawings.

Figure 1:
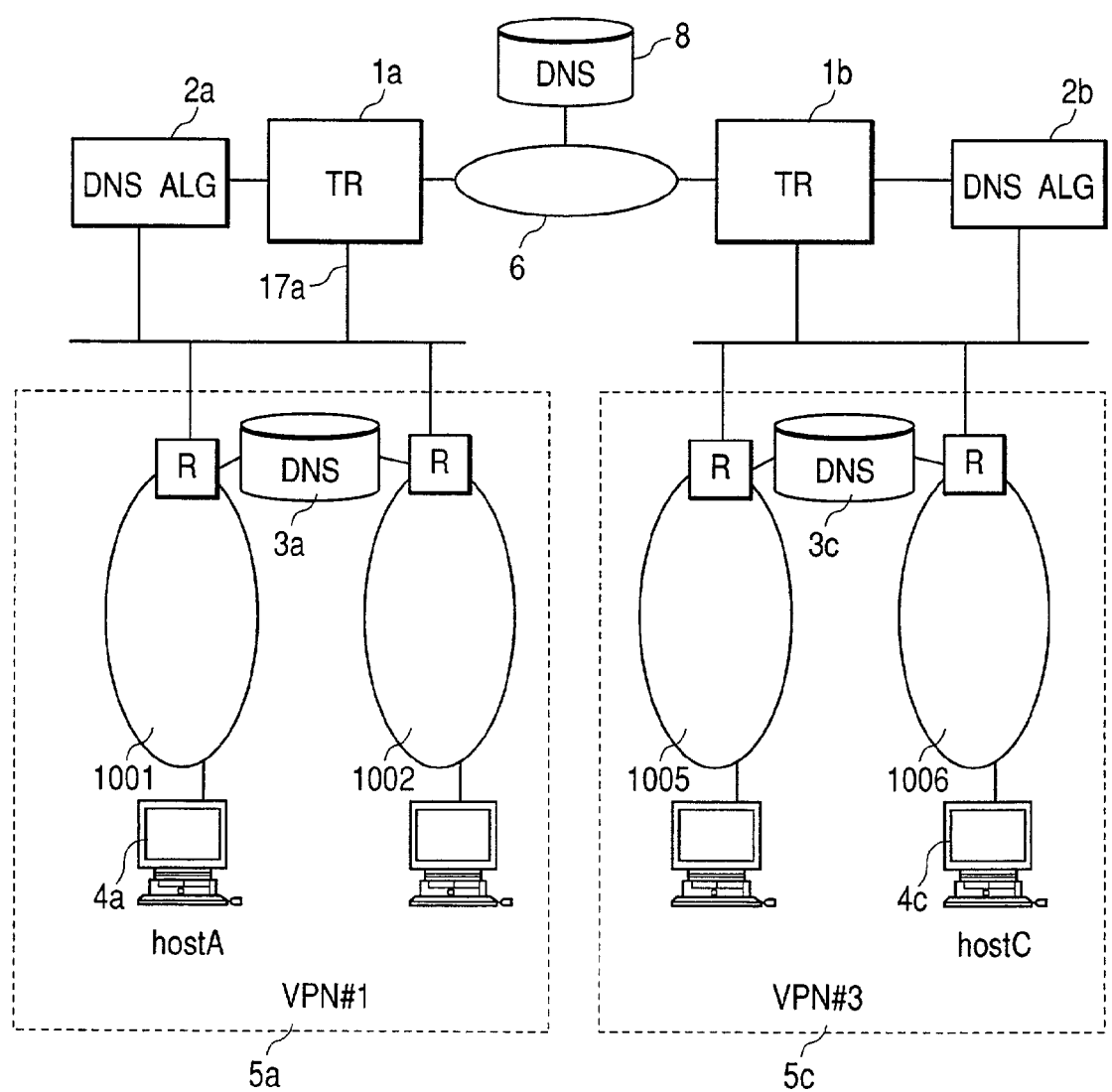
FIG. 1 is a block diagram showing mutual connection construction of VPN's through an IP network according to a first embodiment of the invention.

FIG. 1 illustrates an example of construction of a network for presenting an inter-VPN connection service according to the invention. The network presenting the inter-VPN connection service comprises a VPN 5 and an IP network 6. The VPN 5 includes a DNS server 3. A VPN 5a virtually interconnects bases 1001 and 1002 of an enterprise, for instance. In the present embodiment, the VPN 5 utilizes an IPv4 private address. The IP addresses do not overlap each other in one VPN, but they may overlap each other between different VPN's. The IP network 6 includes a DNS server 8. In the present embodiment, the IP network 6 utilizes an IPv6 address.

The VPN 5 and the IP network 6 are interconnected through a translator (TR) 1. The translator 1 has the function of translation between the IPv6 address and the IPv4 address, and means for communication with a DNS-ALG 2. The DNS-ALG 2 manages translation information necessary for address translation which is represented by the correspondence relation between the IPv4 address and the IPv6 address and is owned by a plurality of translators, and includes means for rewriting a query made by the DNS and the contents of a reply packet to the query. In the first embodiment, the DNS-ALG 2 is provided for each VPN 5.

Figure 2:
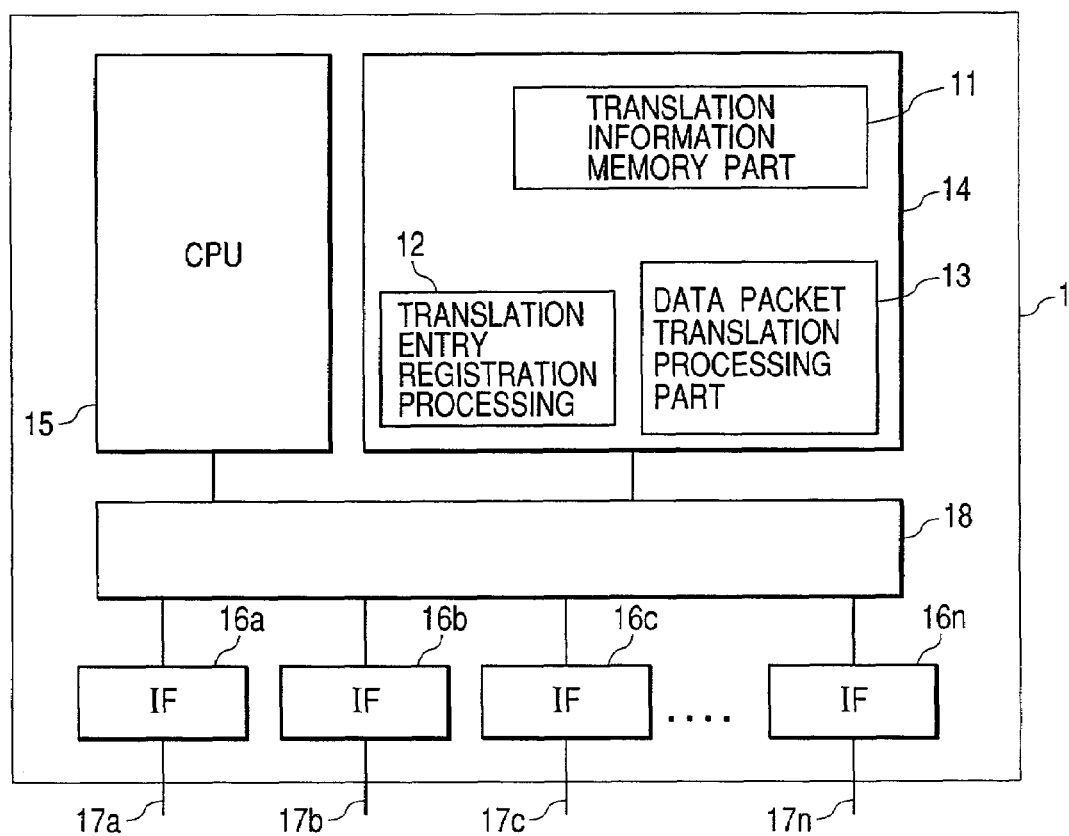
FIG. 2 is a block diagram showing an example of a translator.

FIG. 2 illustrates an example of construction of the translator 1. The translator 1 includes interface (IF) units 16a, 16b, 16c, . . . , 16n for accommodating circuits 17a, 17b, 17c, . . . , 17n, a memory 14, and a CPU 15, which are coupled to each other through a switch or bus 18. The memory 14 stores information 11 necessary for address translation, a program 13 for translation of data packet, and a program 12 necessary for processing a translation entry registration request from the DNS-ALG 2. The translation information memory part 11 includes a virtual prefix management table 300 shown in FIG. 9, and a translation information table 500 shown in FIG. 11.

FIG. 9 shows table construction of the virtual prefix management table 300. This table consists of a plurality of entries 300-1 to 300-n generated in respect of the individual circuit numbers of the translator 1. Each entry defines a virtual prefix 302 and a pointer 303 to the translation information table 500 in correspondence to a circuit number 301.

FIG. 11 shows table construction of the translation information table 500. This table stores the correspondence relation between IPv4 address 501 and IPv6 address 502. This table is created in respect of each VPN, so that tables 510, 520 and 530 are each stored in the translation information memory part 11 of the translator 1 accommodating the VPN. For example, in connection with FIG. 1, the VPN#1 translation information table 510 is stored in a translator 1a, and the VPN#3 translation information table 530 is stored in a translator 1b.

Figure 4:
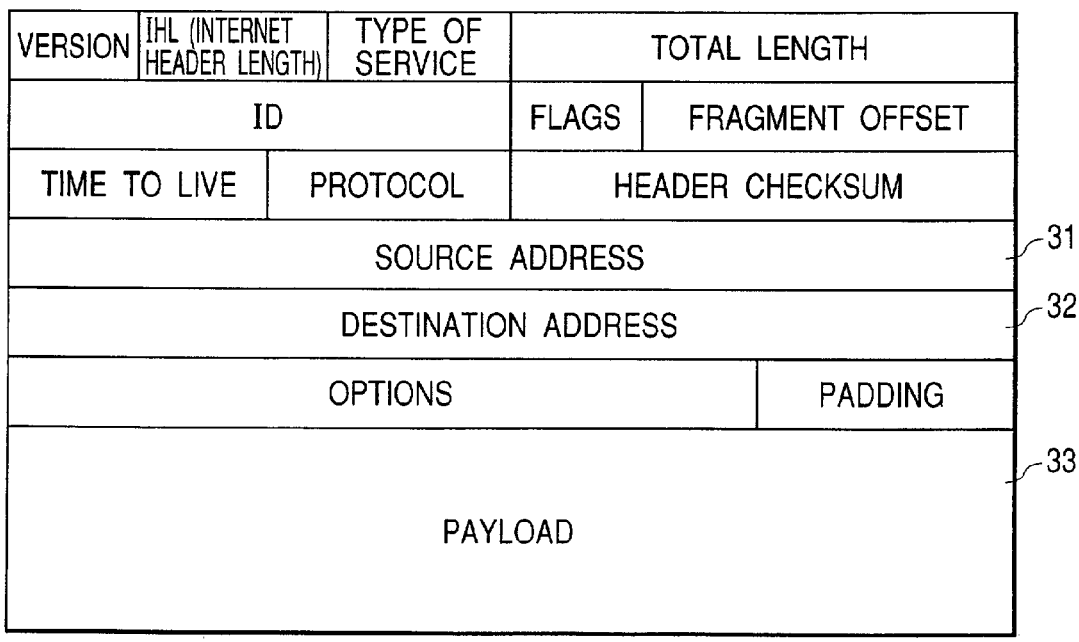
FIG. 4 is a format diagram of an IPv4 packet.
Figure 5:
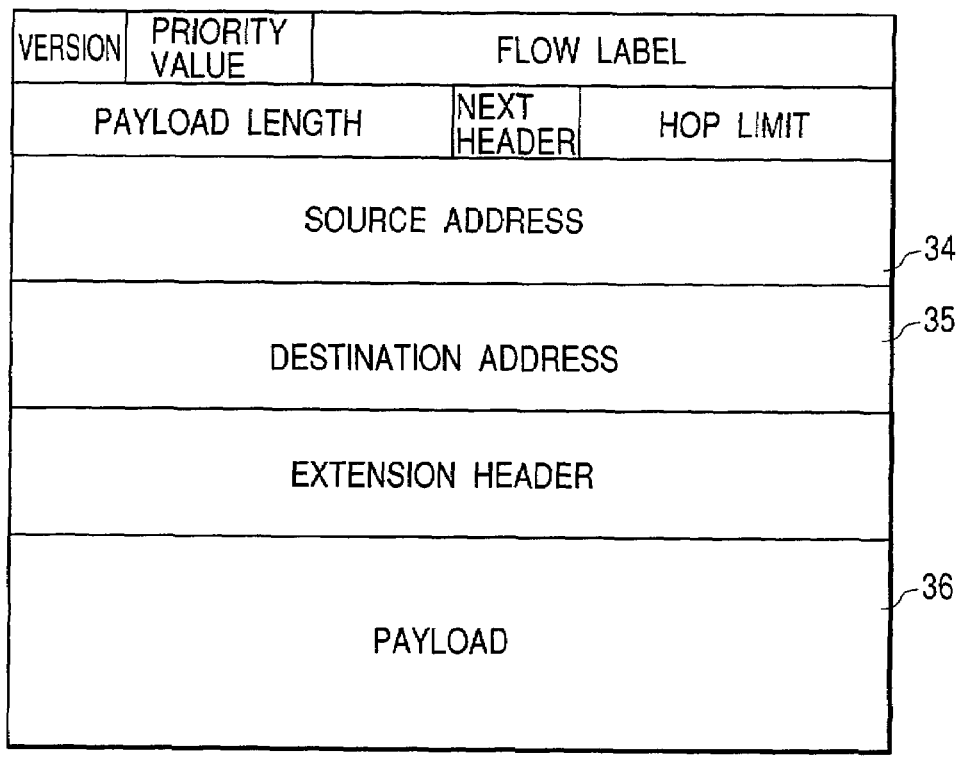
FIG. 5 is a format diagram of an IPv6 packet.

Reverting to FIG. 2, a continued description of the translator 1 will be given. In the translation entry registration processing 12, a translation information registration request is processed to store correspondence information of IP address in the translation information table 500 of the translation information memory part 11. When receiving an IPv4 packet, the data packet translation-processing part 13 retrieves the translation information memory part 11, and rewrites an IPv6 address to an IPv4 address. Conversely, when the data packet translation-processing part 13 receives an IPv6 packet, it retrieves the translation information memory part 11, and rewrites an IPv4 address to an IPv6 address. In this phase, the data packet translation-processing part can rewrite various kinds of information in addition to the IP address. An IPv4 packet format is shown in FIG. 4. An IPv6 packet format is shown in FIG. 5. During translation, not only the IP address but also the format as above is translated.

Figure 3:
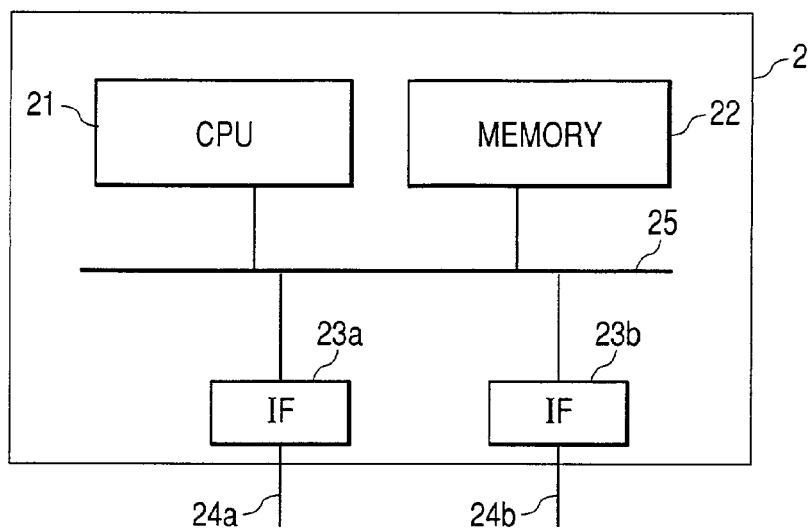
FIG. 3 is a block diagram showing an example of a DNS-ALG 2.

FIG. 3 illustrates an example of construction of the DNS-ALG 2. The DNS-ALG2 is constructed so as to couple interface (IF) units 23a and 23b accommodating circuits 24a and 24b, a memory 22, and a CPU 21 to each other through a bus 25.

Figure 6:
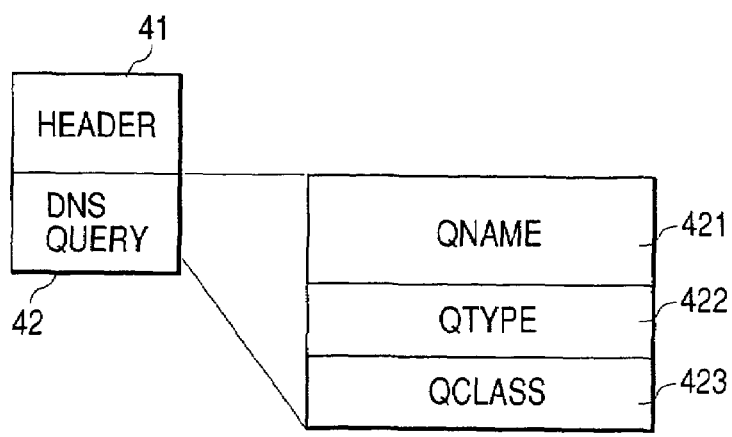
FIG. 6 is a format diagram of a DNS query.

An instance where a terminal 4a of VPN 5a communicates with a terminal 4c of VPN 5c in FIG. 1 will be described in accordance with the sequence shown in FIGS. 14 and 15. Upon initiation of communication, the terminal 4a makes a DNS query to a DNS server 3a in order to obtain an address of name (assumed to be "hostC") of the terminal 4c (step 101). A packet format of the DNS query is shown in FIG. 6. The name hostC and the type "A" of resource record are described in QNAME 421 and QTYPE 422, respectively, in FIG. 6.

Reverting to FIG. 14, a continued description will be given. Since the DNS server 3a does not know an IP address corresponding to this name hostC, the DNS server 3a makes a DNS query to the next DNS server, that is, DNS-ALG 2a (step 102).

Figure 12:
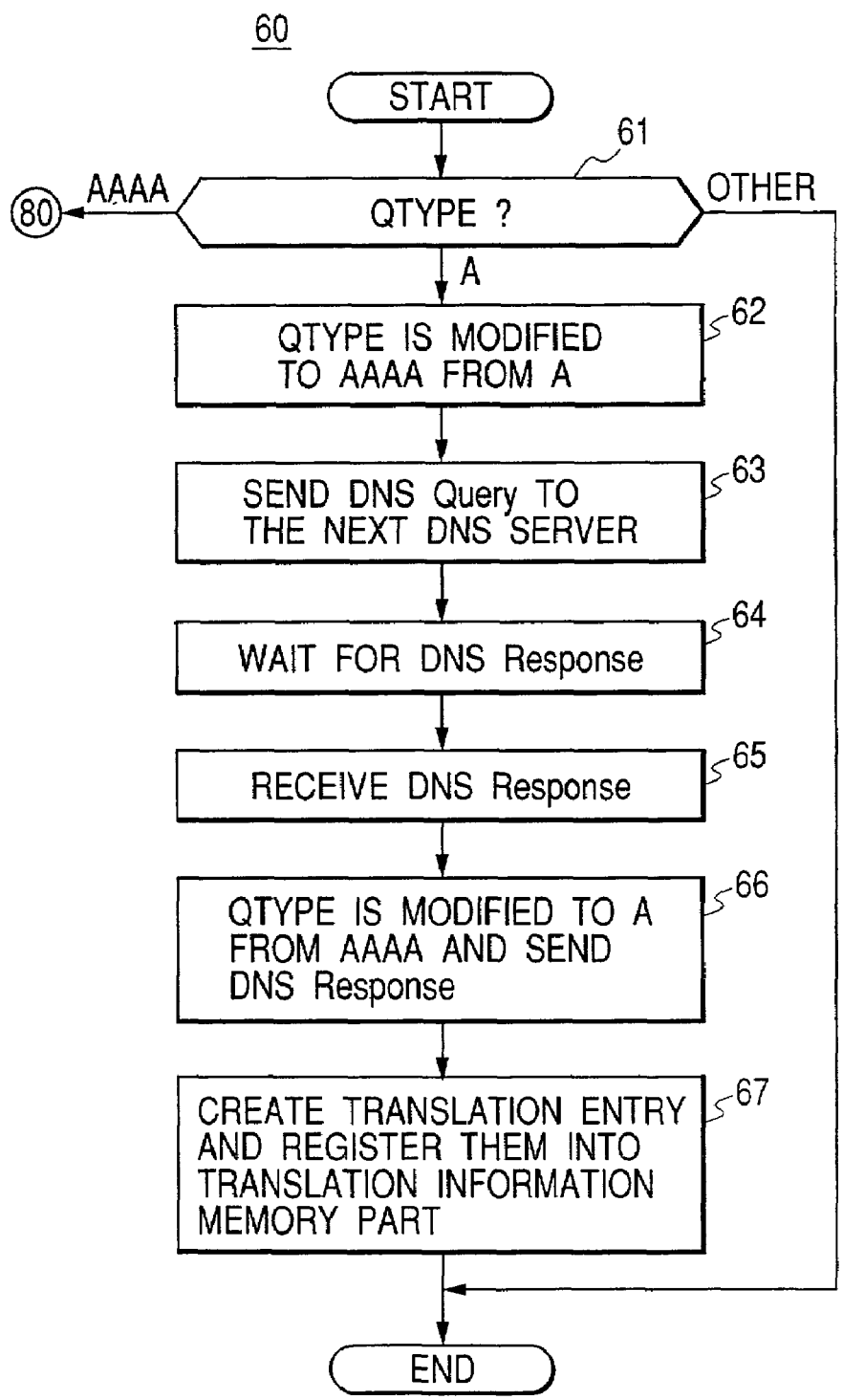
FIG. 12 is a flowchart of a DNS message translation processing routine provided for the DNS-ALG 2.
Figure 13:
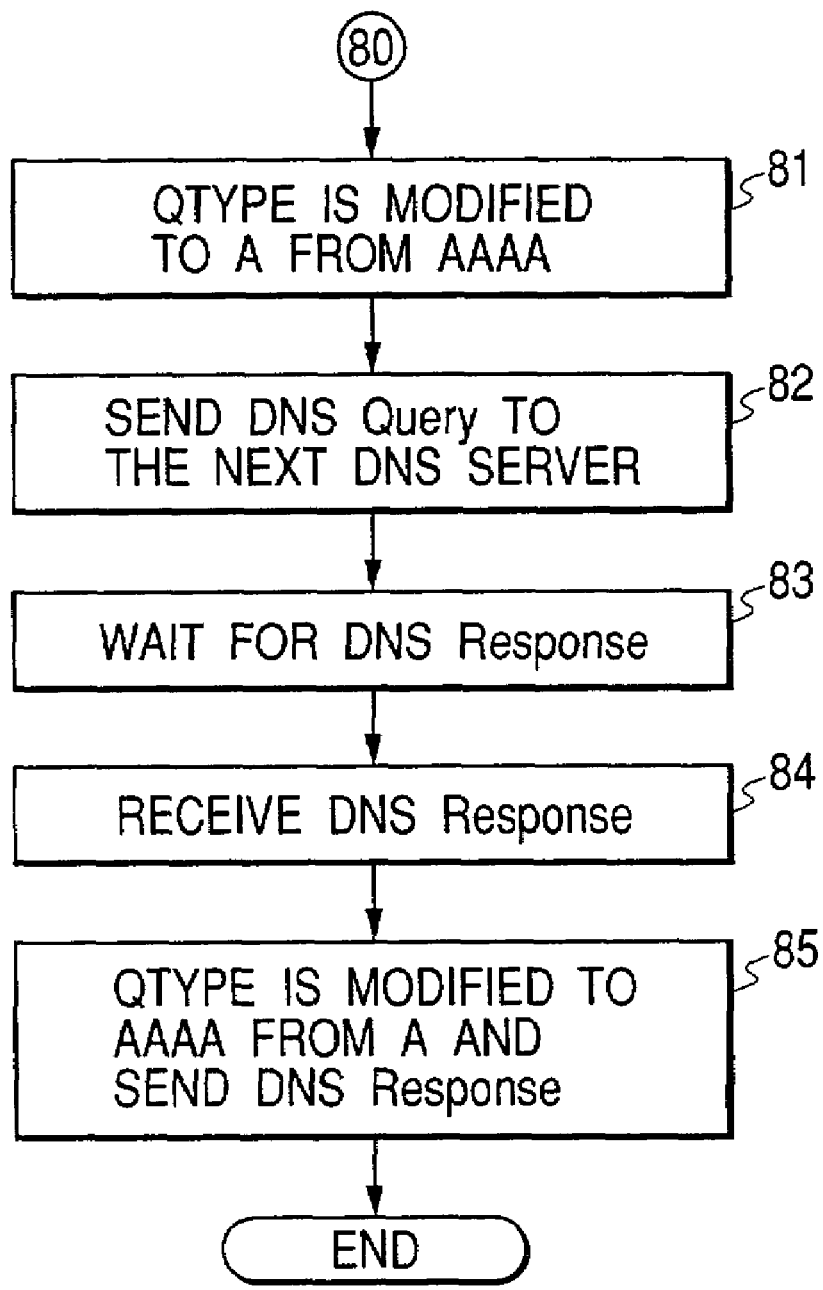
FIG. 13 is a flowchart of the DNS message translation processing routine provided for the DNS-ALG 2.

If the DNS-ALG 2a does not know the IP address corresponding to the name hostC, it starts a processing routine shown in FIGS. 12 and 13. When QTYPE of the DNS query is "A", the DNS-ALG 2a modifies the QTYPE to "AAAA" (steps 62 and 103). The DNS-ALG 2a sends the modified DNS query to the next DNS server 8 (steps 63 and 104), and waits for a DNS response (step 64). The DNS server 8 sends a DNS query to the next DNS server, that is, DNS-ALG 2b (step 105). In case the DNS-ALG 2b does not know the IP address corresponding to the name hostC, it starts the processing routine 60 shown in FIGS. 12 and 13. When QTYPE of the DNS query is "AAAA", the QTYPE is modified to "A" (steps 81 and 106). The DNS-ALG 2b sends the modified DNS query to the next DNS server 3c (steps 82 and 107), and waits for a DNS response (step 83). The DNS server 3c responds an IPv4 address "c" corresponding to the name hostC (steps 84 and 108).

Figure 7:
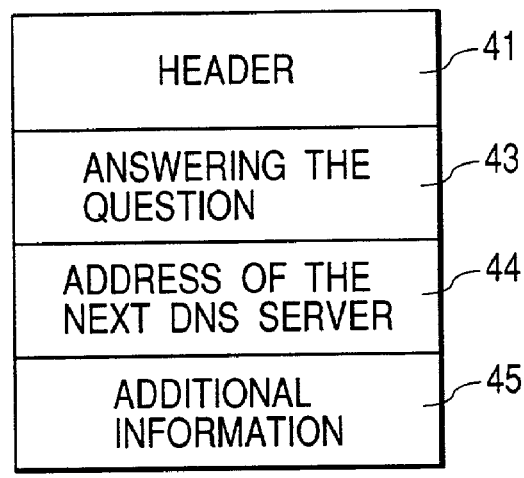
FIG. 7 is a format diagram of a DNS response.
Figure 8:
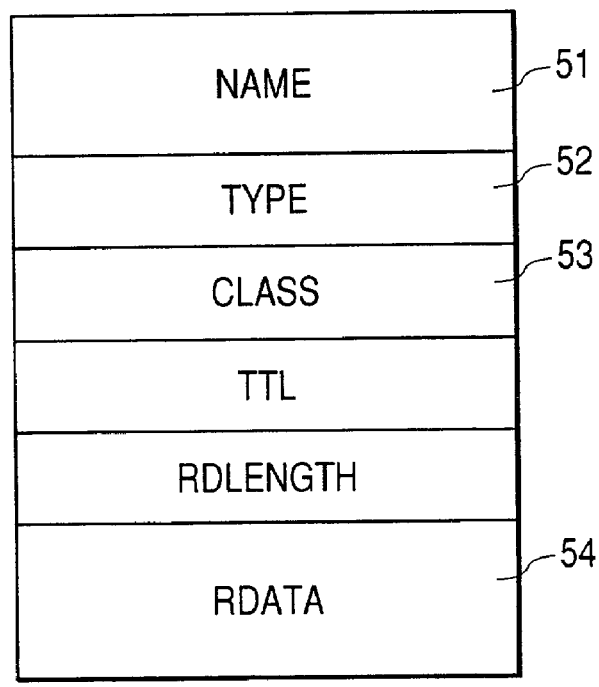
FIG. 8 is a detailed format diagram of the DNS response.

FIG. 7 shows a format of a DNS response packet from the DNS server 3c. Detailed formats of 43, 44 and 45 in FIG. 7 are shown in FIG. 8. The name hostC and the IP address "c" are described in NAME 51 and RDATA 54, respectively.

Figure 14:
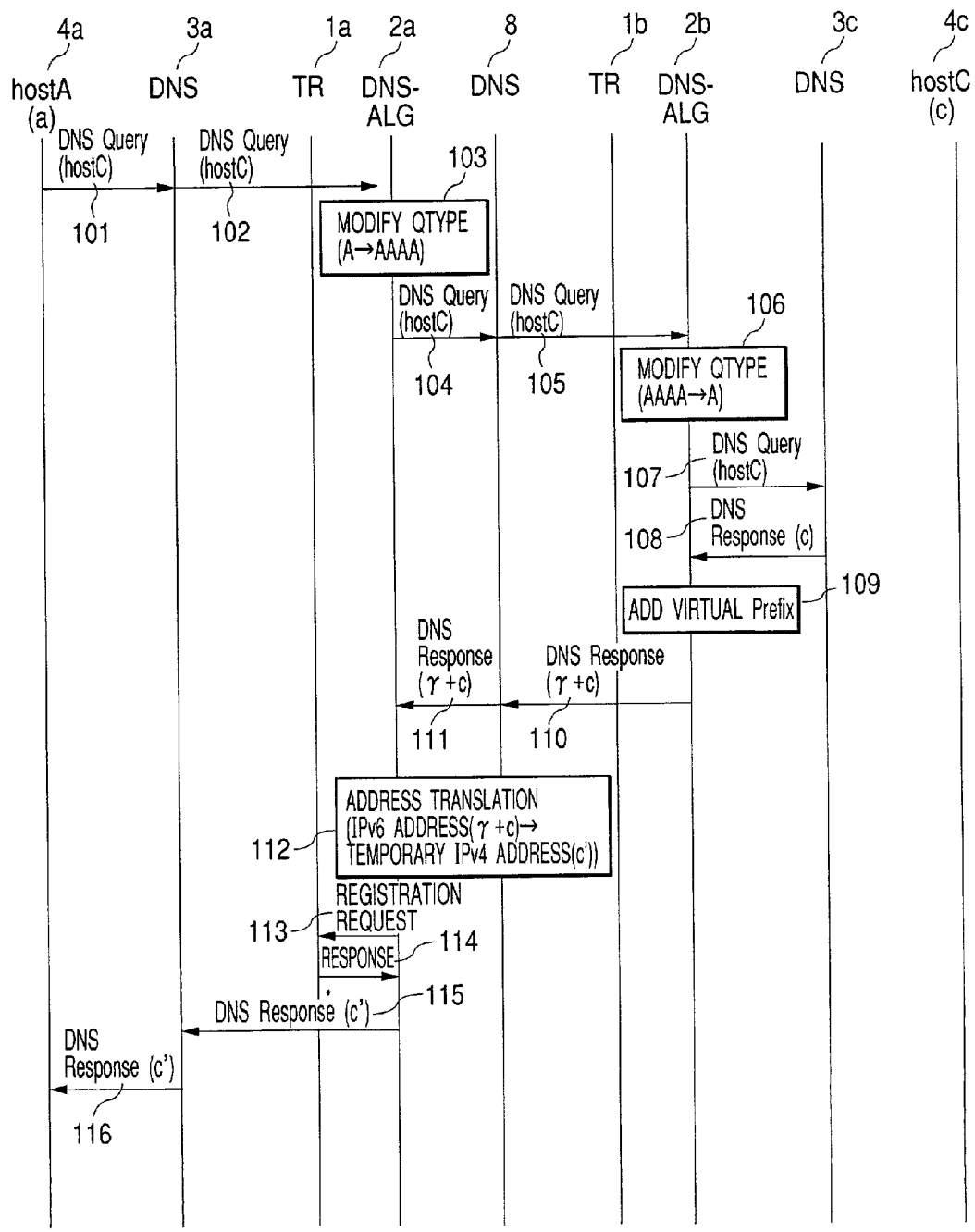
FIG. 14 is a sequence diagram of name resolution in the first embodiment of the invention.

With reference to FIG. 14, the DNS-ALG 2b translates the IPv4 address "c" to an IPv6 address "γ+c" for the sake of subsequent translation. The IPv6address is constructed of a virtual IPv6 prefix (γ) assigned to the VPN 5c and the IPv4 address (c) (step 109). This address will hereinafter be called a "destination temporary IPv6 address". The DNS-ALG 2b modifies TYPE 52 of the DNS response from "A" to "AAAA", and sends a DNS response having "γ+c" set in RDATA 54 to the DNS server 8 (steps 85 and 110). The DNS server 8 responds to the DNS-ALG 2a by the destination temporary IPv6 address "γ+c" corresponding to the name hostC (steps 65 and 111).

The DNS-ALG 2a translates this IPv6 address "γ+c" to the IPv4 address c' for the sake of subsequent translation (step 112). This IPv4 address is a temporary address for the name hostC, and is selected from a set of IP addresses not used by the VPN 5a. This address will hereinafter be called a "destination temporary IPv4 address". The DNS-ALF 2a modifies TYPE 52 of the DNS response from "AAAA" to "A", and sends a DNS response having the destination temporary IPv4address "c'" set in RDATA 54 to the terminal 4a via the DNS server 3a (steps 66, 115 and 116). In this phase, a translation rule for making the correspondence between γ+c and c' is prepared which in turn is sent to the translator 1a (steps 67 and 113). The translator 1a stores the translation rule in a VPN#1 translation information table 510 inside the translation information memory part 11, and sends a response to the DNS-ALG 2a (step 114).

The terminal 4a receiving the DNS response starts to send IP packets to the terminal 4c. A destination address of these packets is c', and their source address is an IPv4 address "a" of the terminal (step 131).

As the packet arrives, the translator 1a sends it to the data packet translation·processing part 13. Here, the retrieval is performed to the translation information memory part 11 on the basis of a circuit number through which the data is received, and the destination address c'. Then, since the entry prepared in the step 113 is found in the translation information table 510, the destination address "c'" is translated to "γ+c". The source address is rewritten to a source temporary IPv6 address "α+a" which is added with a virtual IPv6 prefix α corresponding to the circuit number through which the data is received (step 132). The translator 1a sends a packet in which "γ+c" and "α+a" are set in the destination and source addresses, respectively (step 133). A translator 1b sends this packet to the data packet translation·processing part 13. Here, the virtual IPv6 prefix γ is deleted from the destination address. In order to uniquely identify the source address "α+a" inside the VPN 5c, it is translated to an IPv4 address "a1'". This IPv4 address is a temporary address for the source address "α+a", and is selected from a set of IP addresses not used inside the VPN 5c. Hereinafter, this address will be called a "source temporary IPv4 address".

The translator 1b prepares a translation rule for making the correspondence between "α+a" and "a1'", and stores it in the VPN#3 translation information table 530 of the translation information memory part 11 (step 134).

The terminal 4c receives a packet having the destination and source addresses set with "c" and "a1'", respectively (step 135). The terminal 4c sends an IP packet having the destination and source addresses set with "a1'" and "c", respectively, to the terminal 4a (step 136). As this packet arrives, the translator 1b sends it to the data packet translation·processing part 13. Here, retrieval is performed to the translation information memory part 11 on the basis of a circuit number through which the data is received, and the destination address "a1'". Then, since the entry prepared in the step 134 is found in the translation information table 530, the destination address "a1'" is translated to "α+a". The source address is rewritten to a source temporary IPv6 address "γ+c" which is added with a virtual IPv6 prefix γ corresponding to the circuit number through which the data is received (step 137). The translator 1b sends a packet with "α+a" set in the destination address and "γ+c" set in the source address (step 138).

As this packet arrives, the translator 1a sends it to the data packet translation·processing part 13. Here, the virtual IPv6 prefix is deleted from the destination address. Retrieval is performed to the translation information memory part 11 on the basis of the virtual IPv6 prefix "α" of destination address and the source address "γ+c". Then, since the entry prepared precedently is found in the translation information table 510, the source address is translated from "γ+c" to "c'" (step 139).

The terminal 4a receives the packet having the destination and source addresses set with "a" and "c'", respectively (step 140).

According to the present embodiment of the invention, the translator 1 cooperates with the DNS-ALG 2 to make good use of the virtual IPv6 of the IP network 6 to thereby permit mutual communication between VPN's having the private IPv4 address.

A second embodiment of the invention will be described with reference to the drawings.

Figure 16:
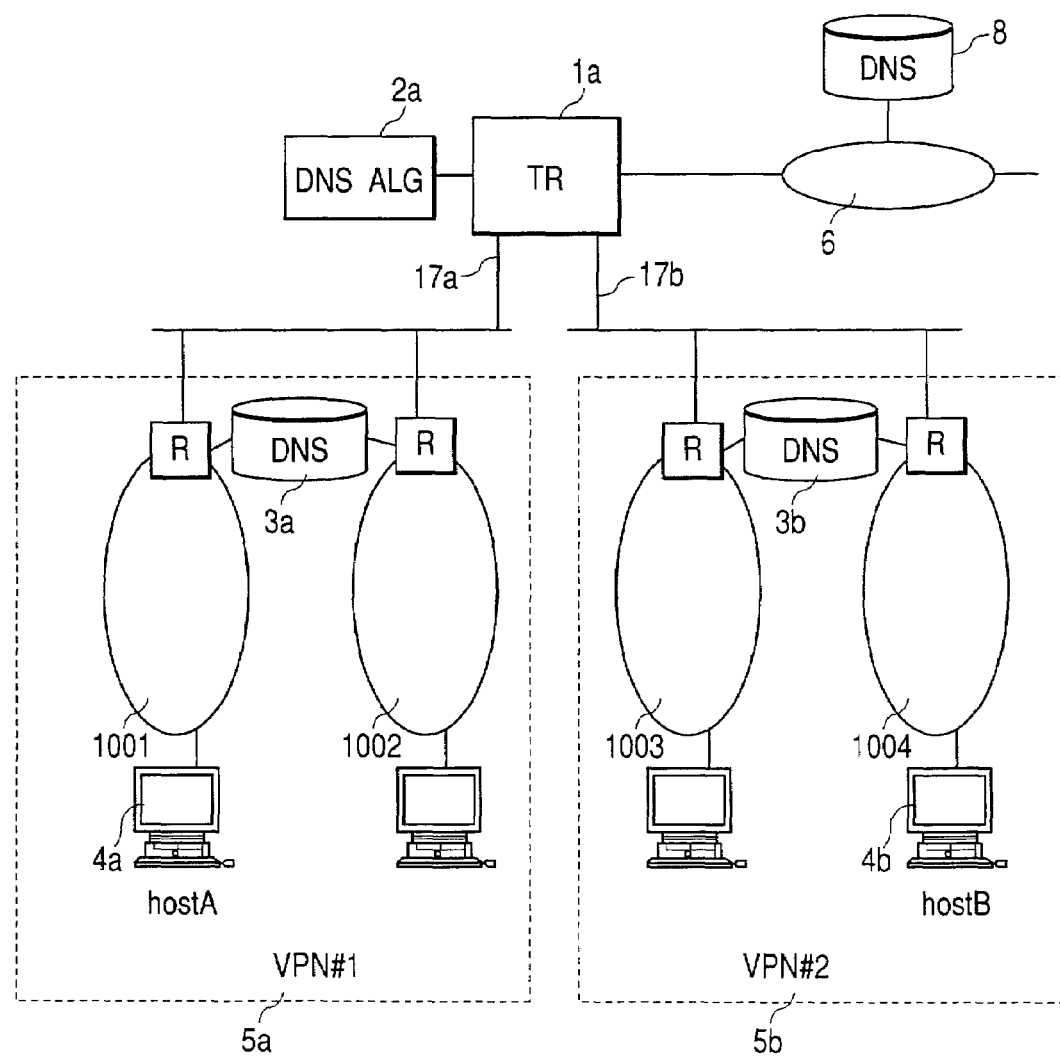
FIG. 16 is a block diagram showing network construction when a plurality of VPN's are connected to a translator according to a second embodiment of the invention.

FIG. 16 shows a network construction according to the second embodiment of the invention. In comparison with FIG. 1, the network construction of FIG. 16 is characterized in that "communication between the DNS server 3 in the VPN 5 and the DNS-ALG 2 is carried out via the translator 1", and in that "in mutual communication between VPN's, the DNS server to which the DNS-ALG 2 makes a query next is set with another IPv6 address inside the DNS-ALG 2".

In the present embodiment, the DNS-ALG 2 is a multi-home node having an IPv6 address in correspondence to a VPN connected to the translator 1. In a DNS-ALG 2a according to the present embodiment, when a DNS server queried next does not exist in a VPN that has sent a DNS query, another IPv6 address of the DNS-ALG 2a is stored as address information of the DNS server queried next. If a DNS server queried next exist in a VPN that has sent a DNS query, a temporary IPv6 address of the DNS server present in the VPN is stored as address information of the DNS server queried next. This temporary IPv6 address is constructed of "a virtual prefix and an IPv4 address assigned to the DNS server in each VPN".

The translator 1 in the present embodiment further includes DNS-ALG address translation information for each VPN, the function of monitoring a packet containing a message of the DNS, and the function of translating an address of the packet containing a message of the DNS. DNS-ALG address translation information for each VPN manages, in respect of the VPN, the correspondence relation between IPv6 address of DNS-ALG and temporary IPv4 address assigned to the DNS-ALG for identifying the DNS-ALG inside the VPN.

Figure 17:
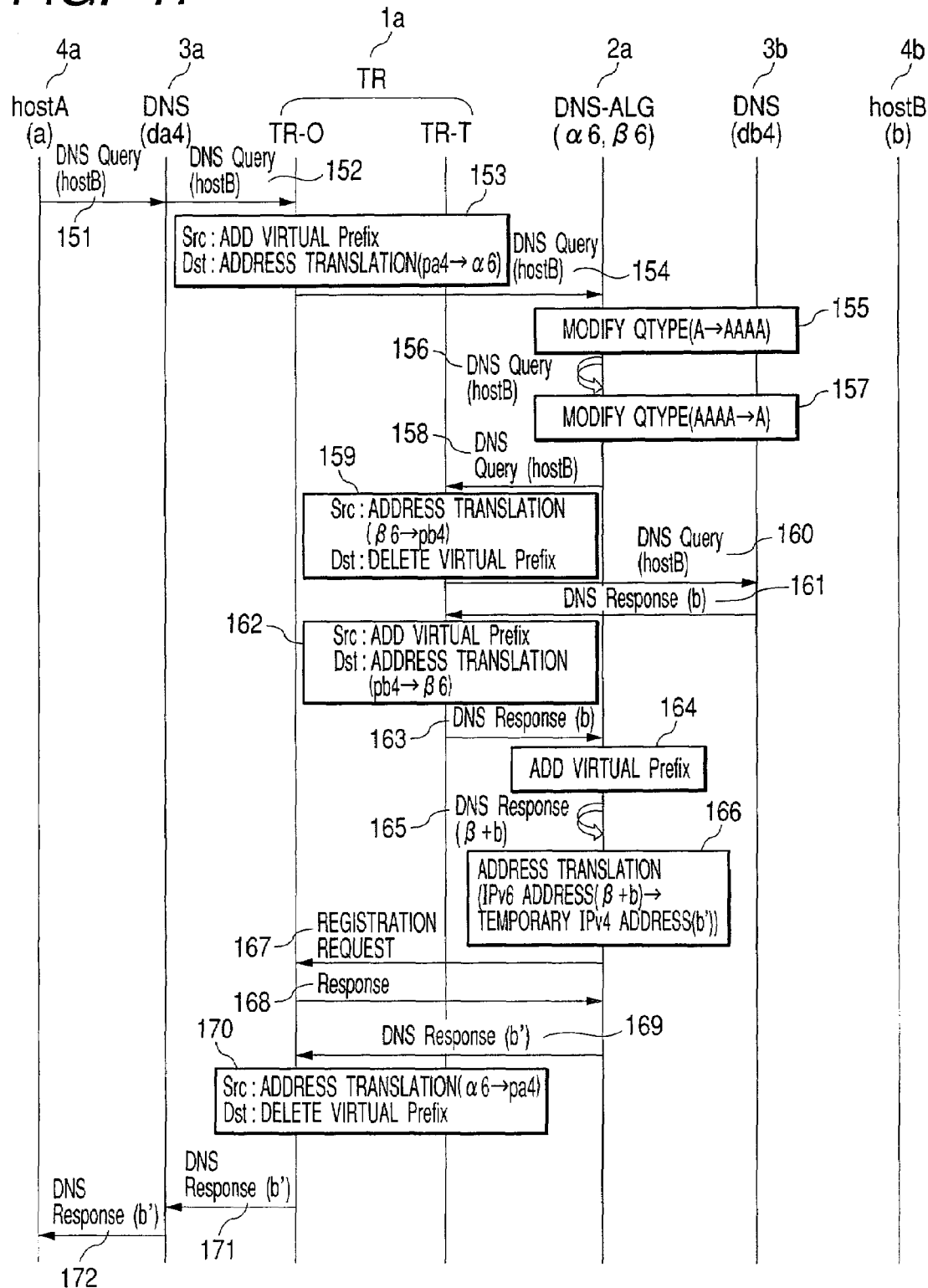
FIG. 17 is a sequence diagram of name resolution in the second embodiment of the invention.
Figure 18:
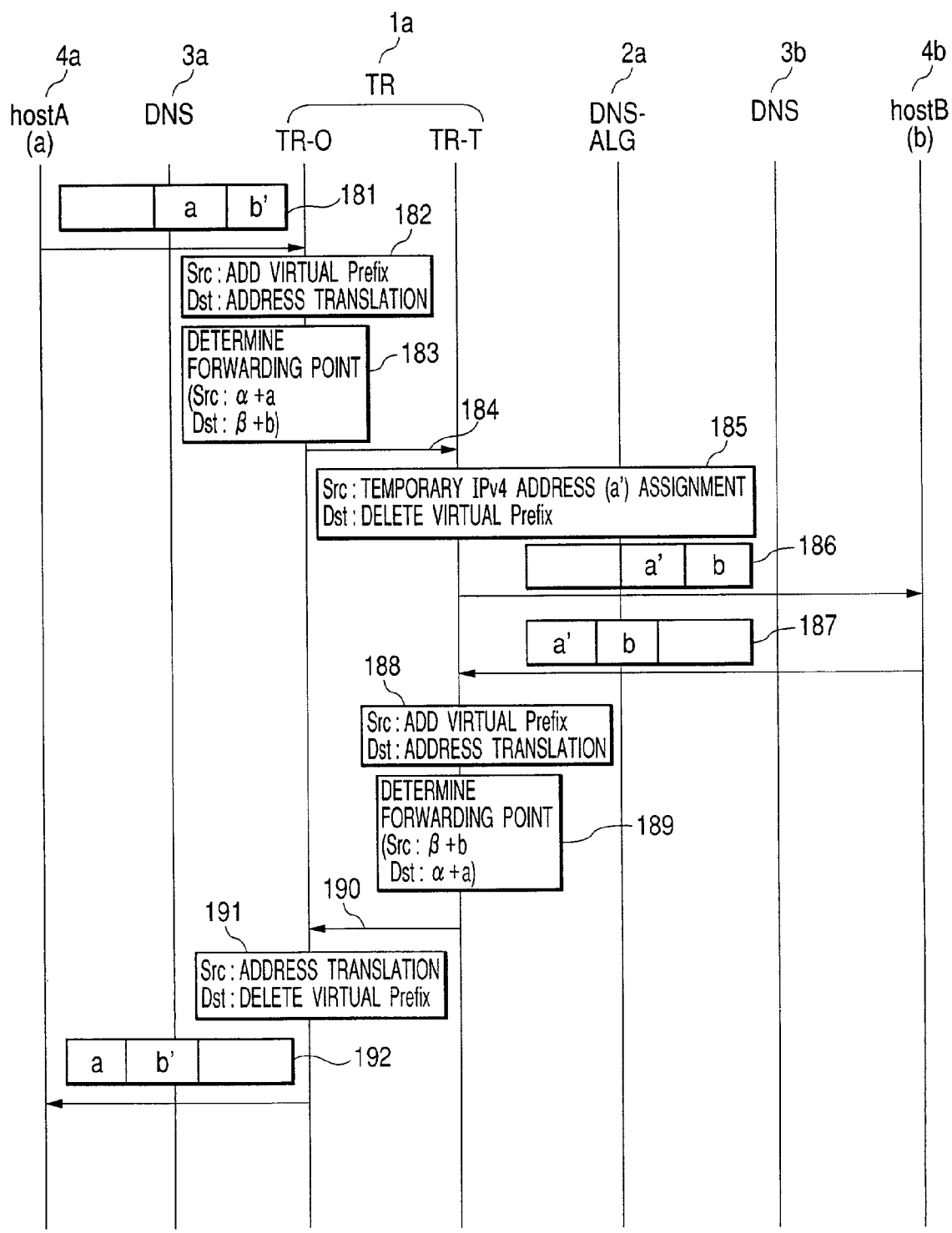
FIG. 18 is a sequence diagram when VPN's communicate with each other in the second embodiment of the invention.

In accordance with the sequence shown in FIGS. 17 and 18, an instance where a terminal 4*a* present in a VPN 5*a* communicates with a terminal 4*b* present in a VPN 5*b* in FIG. 16 will be described. The VPN 5*a* and the VPN 5*b* are connected to the translator 1*a*. Address translation of packets transmitted/received between the VPN 5*a* and the translator 1*a*, and address translation of packets transmitted/received between the VPN 5*b* and the translator 1*a* are carried out by the translator 1*a*. In FIGS. 17 and 18, the address translation function between the VPN 5*a* and the translator 1*a* is described as TR-O, and the address translation function between the VPN 5*b* and the translator 1*a* is described as TR-T.

FIG. 17 mainly differs from FIG. 14 in that "the translator 1*a* translates an address of a packet containing a message of the DNS", and in that "the IPv6 address of the DNS-ALG 2*a* differs for individual VPN's".

A detailed description will be given with reference to FIGS. 17 and 18. The terminal 4*a* makes a DNS query to a DNS server 3*a* in order to resolve a name (assumed to be "hostB") of the terminal 4*b* (step 151). The DNS server 3*a* (having an IPv4 address of "da4") does not know an IP address corresponding to the name hostB, so that it makes a DNS query to the next DNS server (DNS-ALG 2*a* having a temporary IPv4 address "pa4") (step 152).

The TR-O of the translator 1*a* detects a packet containing a message of the DNS, and translates the packet (step 153). A destination address is translated to an IP v6 address "α6" for the VPN 5*a* in the DNS-ALG 2*a* by using DNS-ALG address translation information provided for the translator 1*a*. A source address is added with a virtual IPv6 prefix "α" for the VPN 5*a* by referring to the virtual prefix management table 300. The TR-O of the translator 1*a* sends a DNS query packet for which the address is translated, to the DNS-ALG 2*a* (step 154).

When the DNS-ALG 2*a* does not know the IP address corresponding to the name hostB, it modifies the DNS query through the aforementioned processing routine 60 (step 155), and transfers the DNS query (step 156). A destination for which the DNS query is forwarded is set with a different IPv6 address (IPv6 address "βb" for the VPN 5*b*) assigned to the DNS-ALG 2*a*.

If the DNS-ALG 2*a* receiving the DNS query destined for the IPv6 address "β6" for the VPN 5*b* does not know the IP address corresponding to the name hostB, the DNS query modified through the aforementioned processing routine 60 is sent to the next DNS server 3*b* (having a temporary IPv6 address "β+db4" (steps 157 and 158).

The TR-T of the translator 1*a* detects a packet containing a message of the DNS, and translates the packet (step 159). The virtual prefix β is deleted from the destination address. The source address is translated to a temporary IPv4 address "pb4" corresponding to the IPv6 address "β6" of the DNS-ALG 2*a* for the VPN 5*b* by using the DNS-ALG address translation information provided for the translator 1*a*. The TR-T of the translator 1*a* sends the packet for which the address is translated, to the DNS server 3*b* (step 160).

The DNS server 3*b* responds an IPv4 address "b" for the name hostB (step 161). The TR-T of the translator 1*a* detects a packet containing a message of the DNS, and translates the packet (step 162). A virtual prefix β corresponding to the VPN 5*b* is added to the source address. The destination address is translated from "pb4" to "β6" by using the DNS-ALG address translation information provided for the translator 1*a*. The TR-T of the translator 1*a* sends the packet for which the address is translated, to the DNS-ALG 2*a* (step 163).

The DNS-ALG 2*a* adds the virtual prefix β to the IPv4 address "b" for the name hostB so as to rewrite the address "b" to "β+b" (step 164).

The DNS-ALG 2*a* sends a DNS response having its RDATA set with "β+b", to the IPv6 address "α6" for the VPN 5*a* of the DNS-ALG 2*a* (step 165).

The DNS-ALG 2*a* receiving the DNS response translates the IPv6 address "β+b" to a destination temporary IPv4 address "b'" (step 166). This IPv4 address is a temporary address corresponding to the name hostB, and is selected from a set of IP addresses not used by the VPN 5*a*.

The DNS-ALG 2*a* sends the destination temporary IPv4 address "b'" for the name hostB to the terminal 4*a* via the DNS server 3*a* (steps 169, 171 and 172). When detecting the DNS response sent in the step 169, the translator 1*a* translates the packet (step 170). The virtual prefix α is deleted from the destination address. The source address is translated from "α6" to "pa4" by using the DNS-ALG address translation information provided for the translator 1*a*. The TR-O of the translator 1*a* sends the packet for which the address is translated, to the DNS 3*a* (step 171).

The DNS-ALG 2*a* prepares a translation rule for making the correspondence between "β+b" and "b'", and sends it to the translator 1*a* (step 167). The translator 1*a* stores the translation rule in the VPN#1 translation information table 510 of the translation information memory part 11, and sends a response to the DNS-ALG 2*a* (step 168).

Figure 15:
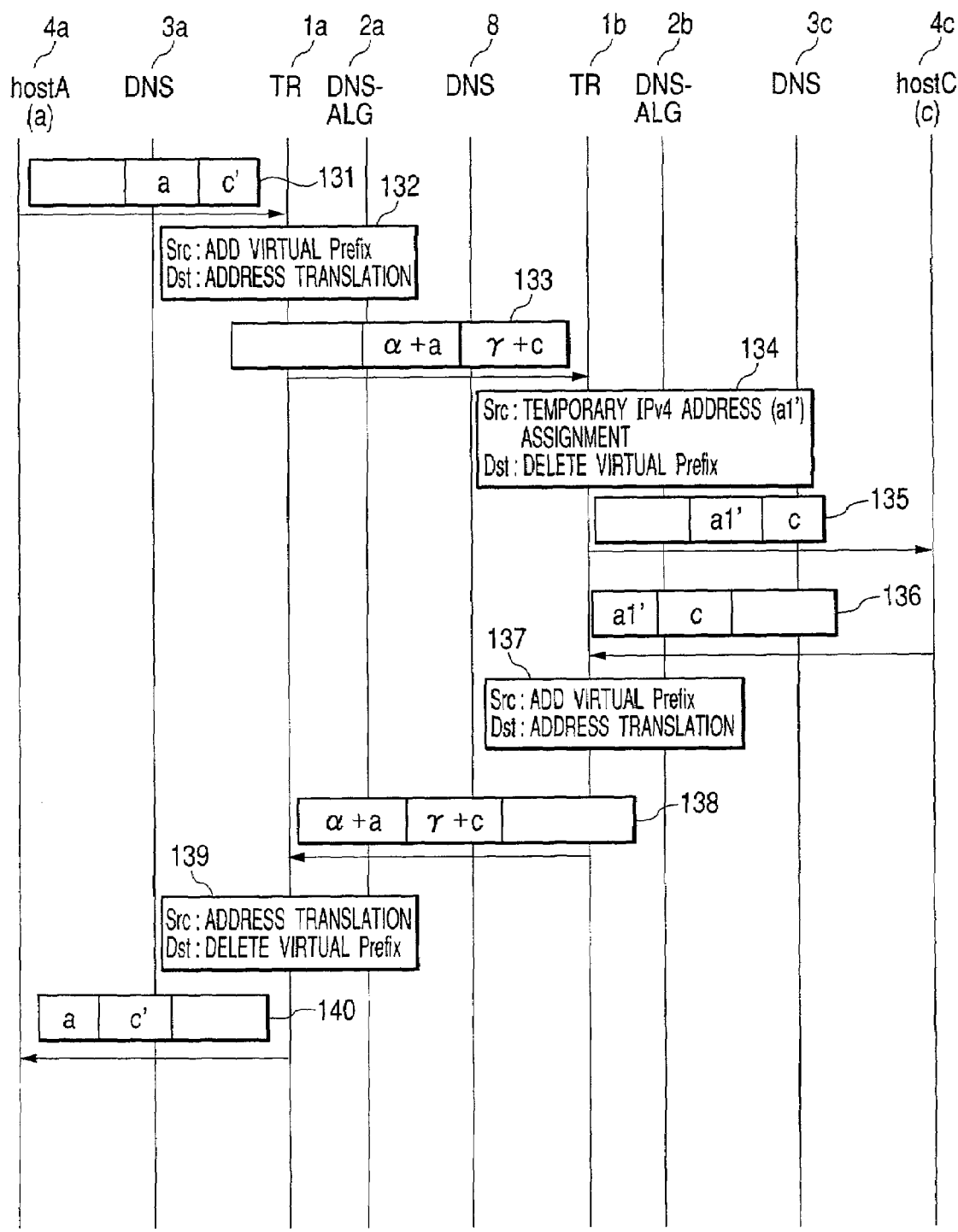
FIG. 15 is a sequence diagram when VPN's communicate with each other in the first embodiment of the invention.

FIG. 18 mainly differs from FIG. 15 in that "the translator 1 translates the destination address and the source address (step 182), causes a packet to undergo routing inside the translator (step 184), and again translates the destination address and the source address (step 185)".

The terminal 4*a* starts to send IP packets to the terminal 4*b*. The destination address of these packets is b', and their source address is the IPv4 address "a" of the terminal (step 181).

As the packet arrives, the translator 1*a* sends it to the data packet translation-processing part 13. Here, retrieval is performed to the translation information memory part 11 on the basis of a circuit number through which the data is received, and the destination address b'. Then, since the entry prepared in the step 167 is found in the translation information table 510, the destination address is translated from "b'" to "β+b". The source address is added with the virtual IPv6 prefix α corresponding to the circuit number through which the data is received (step 182).

The translator 1*a* sends a packet in which "β+b" is set in the destination address and "α+a" is set in the source address (step 183). This packet is subjected to routing inside the translator 1*a* (step 184).

The translator 1*a* sends this packet to the data packet translation-processing part 13. Here, the virtual IPv6 prefix β is deleted from the destination address. The translator 1*a* translates the source address "α+a" to the IPv4 address "a". This IPv4 address is a temporary address corresponding to the IPv6 address "α+a", and is selected from a set of IP addresses not used by the VPN 5*b*.

The translator 1a prepares a translation rule for making the correspondence between "α+a" and "a'", and stores it in the VPN#2 translation information table 520 of the translation information memory part 11 (step 185).

The terminal 4b receives a packet having "b" and "a'" set in the destination and source addresses, respectively (step 186).

The terminal 4b sends to the terminal 4a a packet having "a'" and "b" set in the destination and source addresses (step 187).

As this packet arrives, the translator 1a sends it to the data packet translation·processing part 13. Here, retrieval is performed to the translation information memory part 11 on the basis of a circuit number through which the data is received, and the destination address "a'". Then, since the entry prepared in the step 185 is found in the translation information table 520, the destination address is translated from "a'" to "α+a". The source address is added with a virtual IPv6 prefix "β" corresponding to the circuit number through with the data is received (step 188).

The translator 1a causes the packet having "α+a" and "β+b" set in the destination and source addresses, respectively, to undergo routing inside the translator 1a (steps 189 and 190).

The translator 1a sends this packet to the data packet translation·processing part 13. The virtual IPv6 prefix α is deleted from the destination address "α+a". When retrieval is performed to the translation information memory part 11 on the basis of the destination virtual IPv6 prefix α and the source address "β+b", the entry prepared in advance is found in the translation information table 510, so that the source address is translated from "β+b" to "b'" (step 191).

The terminal 4a receives a packet having "a" set in the destination address and "b'" set in the source address (step 192).

According to the present embodiment, the translator cooperates with the DNS-ALG and the virtual IPv6 prefix is utilized, so that even when addresses overlap each other, the translator connected to a plurality of VPN's can identify definitely the terminal having the private IPv4 address. Accordingly, mutual communication can be permitted between VPN's having the private IPv4 address.

Further, by degenerating DNS-ALG's of the individual VPN's to one physical unit, a DNS-ALG unit can be shared in common by the VPN's.

A third embodiment of the invention will be described with reference to the drawings.

Figure 19:
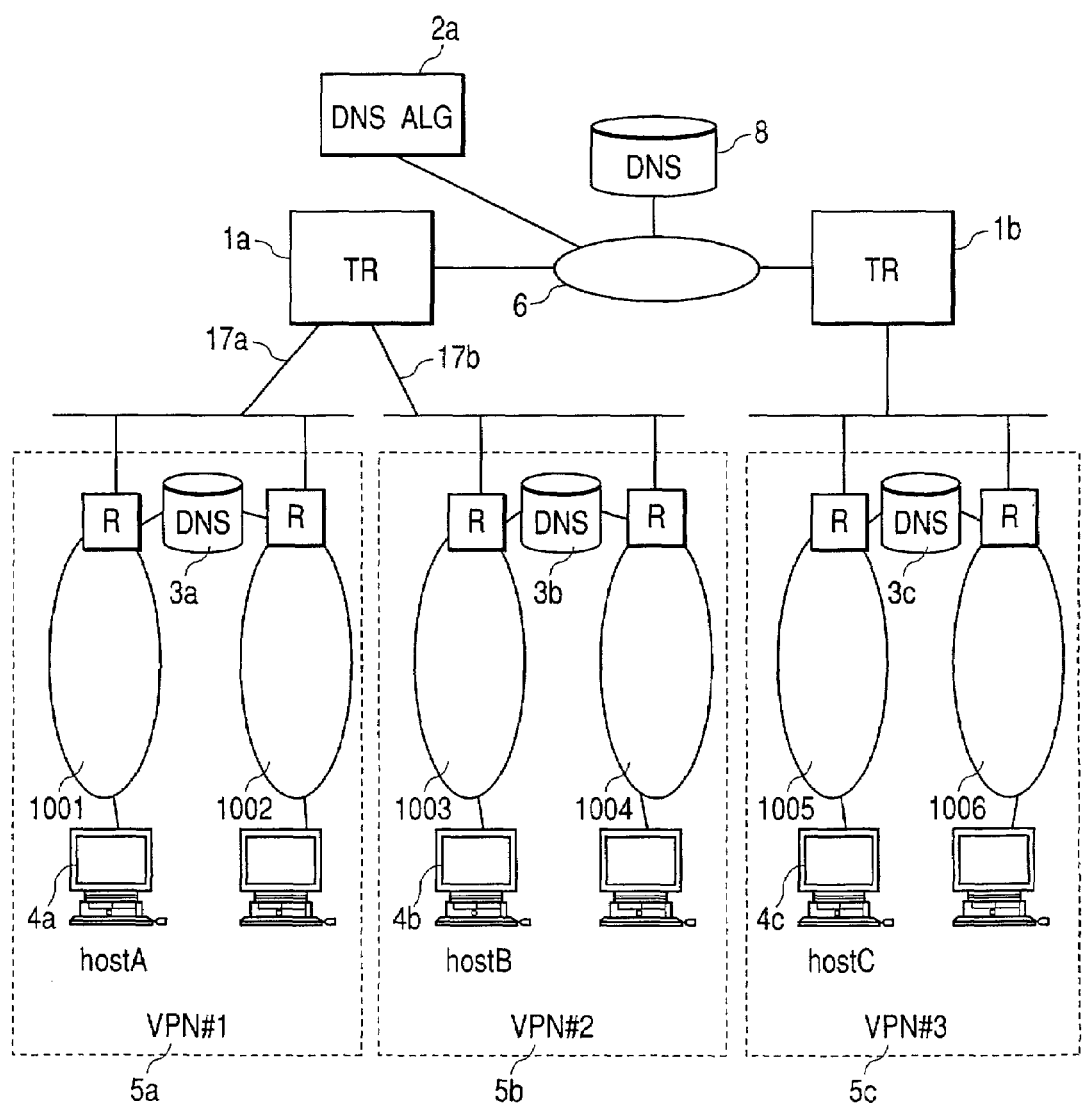
FIG. 19 is a block diagram showing network construction when a plurality of VPN's utilize one DNS-ALG unit according to a third embodiment of the invention.

FIG. 19 shows the network construction according to the third embodiment of the invention. In comparison with FIG. 16, the present embodiment is characterized in that "a plurality of VPN's share a DNS-ALG in common", and in that "a plurality of translators share the DNS-ALG in common". A DNS-ALG 2a in the present embodiment has the function of separately setting transfer destinations for name resolution in respect of individual domains. Specifically, the correspondence relation between a domain name of each VPN and a temporary IPv6 address of a DNS server existing in the VPN is managed as address information of a DNS sever to be queried next. This temporary IPv6 address is constructed of "a virtual prefix and an IPv4 address assigned to the DNS server in each VPN".

The DNS-ALG 2a has, in place of the processing routine 60, the function of performing name resolution with "A" and "AAAA" regardless of the value of QTYPE of name hostB. A translator 1 in the present embodiment has, in addition to the function of the translator 1 in the first embodiment, DNS-ALG address translation information, a function of monitoring a packet containing a message of a DNS, and a function of translating an address of the packet containing a message of a DNS.

The DNS-ALG address translation information manages the correspondence relation between an IPv6 address of the DNS-ALG and a temporary IPv4 address assigned to the DNS-ALG for identifying the DNS-ALG inside the VPN.

An instance will now be described in which a terminal 4a existing in a VPN 5a resolves a name of a terminal 4b existing in a VPN 5b.

In the present embodiment, a translator 1a holds the correspondence relation between the IPv6 address "alg6" of the DNS-ALG 2a and the temporary IPv6 assigned to the DNS-ALG 2a for the sake of identifying the DNS-ALG inside the VPN in respect of the individual VPN's.

The terminal 4a makes a DNS query in order to obtain an address of the name (assumed to be "hostB") of the terminal 4b. A DNS server 3a cannot resolve the name hostB, and therefore it sends the DNS query to the next DNS server (DNS-ALG 2a). A packet header of this DNS query has the destination address set with a temporary IPv4 address "pa4" assigned to the DNS-ALG 2a by means of the VPN 5a, and has the source address set with an IPv4 address "da4" of the DNS 3a.

When detecting this DNS query, the translator 1a translates the destination address from "pa4" to an IPv6 address "alg6" of the DNS-ALG 2a by referring to the DNS-ALG address translation information. The source address is added with an IPv6 prefix α for the VPN 5a so as to be rewritten to "α+da4".

When the DNS-ALG 2a receiving the aforementioned DNS query does not know an IP address for the name hostB, it makes a query to the next DNS server. In this phase, for the purpose of resolving the name hostB, a temporary IPv6 address "β+db4" is set as the DNS server to be queried next. The "β+db4" is a temporary IPv6 address of a DNS server 3b of the VPN 5b.

The DNS-ALG 2a sends the DNS query to the DNS server 3b, and waits for a response. This DNS query has the IPv6 address "alg6" of the DNS-ALG 2a and the "β+db4" set in the source and destination addresses, respectively.

The translator 1a detects a packet of the aforementioned DNS query, and translates the source address (i.e., the IPv6 address "alg6" of the DNS-ALG 2a) to the temporary virtual IPv4 address "pb4" for identifying the DNS-ALG 2a inside the VPN 5b by using the DNS-ALG address translation information for each VPN. In the destination address, the prefix β is deleted so that "β+db4" may be rewritten to "db4".

The DNS server 3b responds to the DNS-ALG 2a with the IPv4 address "b" for the name hostB.

The DNS-ALG 2a rewrites the IPv4 address "b" to the destination temporary IPv6 address "β+b" for the sake of subsequent translation, and thereafter translates "β+b" to the destination temporary IPv4 address "b'". The IPv4 address "b'" is a temporary address for the name hostB, and is selected from a set of IP addresses not used by the VPN 5a.

The DNS-ALG 2a sends the destination temporary IPv4 address "b'" for the name hostB to the terminal 4a via the DNS server 3a.

The subsequent processing flow is the same as that in the second embodiment.

According to the present embodiment, even when the DNS-ALG is not of multi-home node, the DNS-ALG can be shared by the VPN's in common to further alleviate the processing in the DNS-ALG.

A fourth embodiment of the invention will be described with reference to the drawings.

Figure 20:
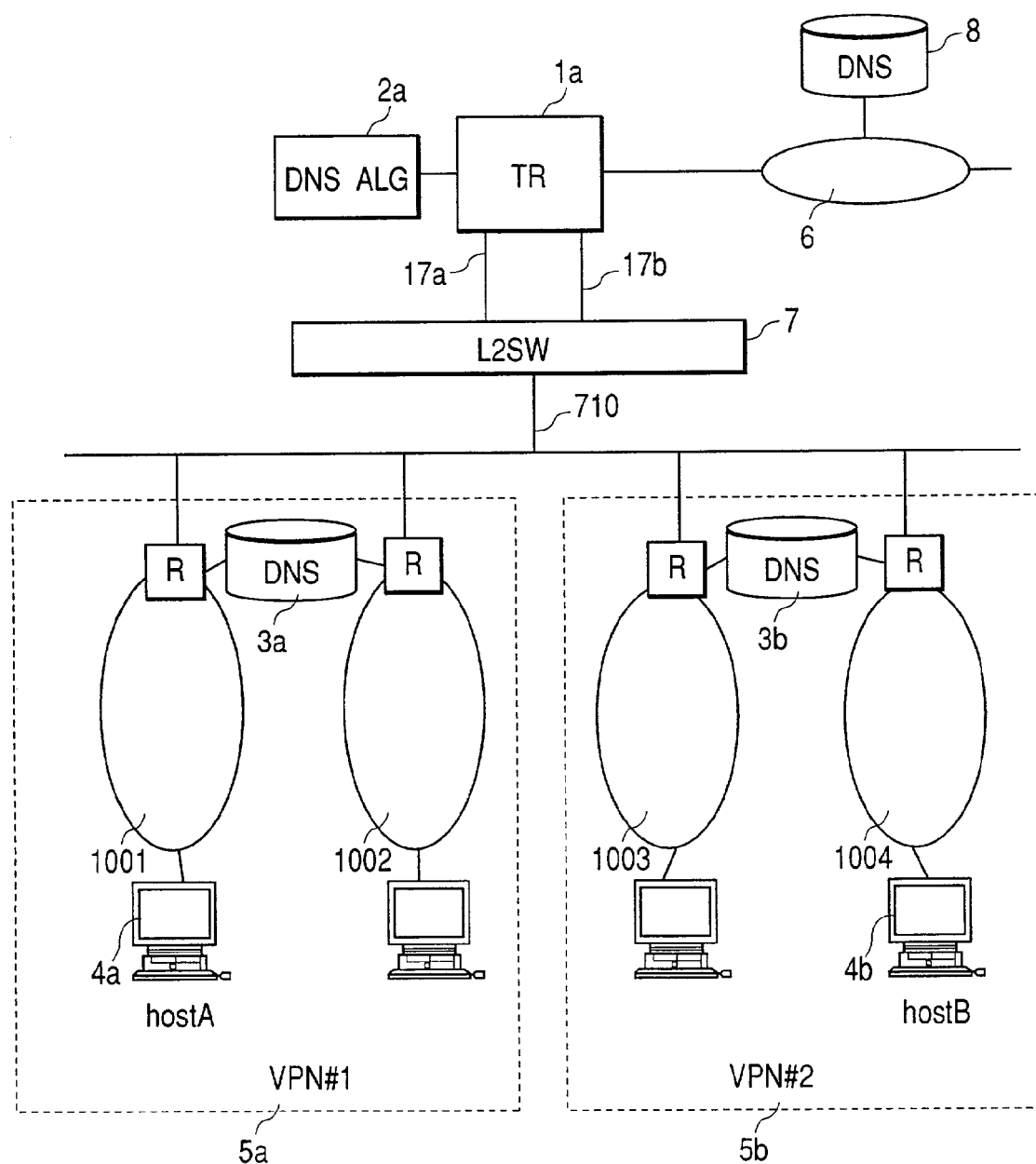
FIG. 20 is a block diagram showing network construction when an L2SW 7 multiplexes VPN's according to a fourth embodiment of the invention.

FIG. 20 shows the network construction according to the fourth embodiment of the invention. In comparison with FIG. 16, the network construction of FIG. 20 is characterized in that "an L2SW 7 multiplexes circuits 17a and 17b of a translator provided for individual VPN's 5". The L2SW 7 in the present embodiment has a VPN management table 320 shown in FIG. 21.

FIG. 21 shows table construction of the VPN management table 320. The present table consists of a plurality of entries 320-1 to 320-n generated in respect of layer two (L2) information represented by MAC address or TAG ID of IEEE 802.1Q. Each entry defines VPN identifier 322 and circuit number 323 of paired translators in correspondence to the L2 information 321.

In the present embodiment, the L2SW 7 that has received a packet from a VPN 5a retrieves the VPN management table 320 on the basis of the L2 information (for example, source MAC address or TAG ID of IEEE 802.1Q) of the received packet. The L2SW 7 sends the packet to a translator 1a through the circuit 17a corresponding to the VPN 5a.

According to the present embodiment of the invention, the L2SW can multiplex the VPN's accommodated by the translator in correspondence with the circuits.

A fifth embodiment of the invention will be described with reference to the drawing.

Figure 22:
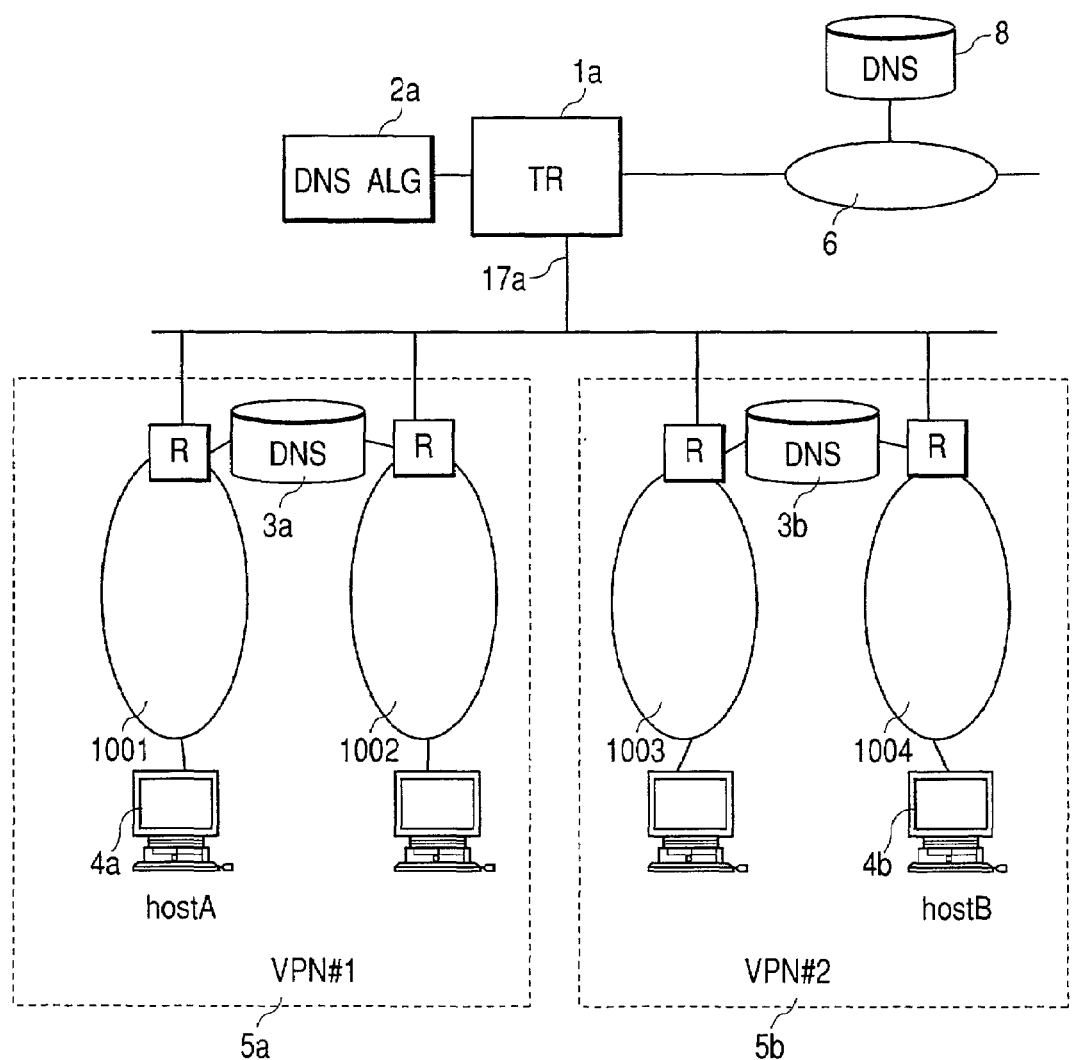
FIG. 22 is a block diagram showing the network construction when the translator 1 utilizes the L2 information to identify the VPN according to a fifth embodiment of the invention.

FIG. 22 shows a network construction according to the fifth embodiment of the invention. In comparison with FIG. 16, the network construction of FIG. 22 is characterized in that "a plurality of VPN's 5a and 5b are accommodated by a circuit 17a of a translator 1a", and in that "the translator 1a includes, in place of the virtual prefix management table 300 shown in FIG. 9, a virtual prefix management table 310 shown in FIG. 10, and identifies a VPN from L2 information".

FIG. 10 shows the table construction of the virtual prefix management table 310. The present table consists of a plurality of entries 310-1 to 310-n generated in respect of layer two (L2) information represented by MAC address or TAG ID of IEEE 802.1Q. Each entry defines VPN identifier 312 and virtual prefix 313 in correspondence to L2 information 311.

In the present embodiment, the translator 1a that has received a packet from the VPN 5a retrieves the virtual prefix management table 310 on the basis of L2 information (for example, source MAC address or TAG ID of IEEE 802.1Q) of the received packet. Then, a virtual prefix corresponding to the L2 information is found in the virtual prefix management table 310. The translator 1a identifies the VPN from the virtual prefix.

According to the present embodiment of the invention, the single circuit of the translator can accommodate the plurality of VPN's.

As will be seen from the foregoing embodiments, according to the invention, through cooperation of the IPv6 based DNS-ALG with the translator, the processing load imposed on the DNS-ALG for generating a temporary address for a destination terminal can be alleviated, and the large-capacity translation table can be reduced in capacity. The processing load and the large-capacity translation table are needed when translation information necessary for address translation based on the conventional Twice NAT is dynamically prepared.

When a provider collectively manages the translator and DNS-ALG according to the present invention and the translator accommodates a plurality of VPN's, mutual communication between VPN's can be ensured without exchanging the existing VPN's.

Disclosed and enumerated below are other variations of the invention.

In an address translation method in a communication network having a plurality of networks A1 and A2 conforming to a first protocol P, a network B conforming to a second protocol Q, a first address translation unit for connecting the networks A1 and B, a second address translation unit for connecting the networks A2 and B, and a server unit, the first and second address translation units have each means for mutually translating the protocols P and Q; means for communication with the server unit; and means, cooperative with the server unit, for preparing translation information including the correspondence relation between an address in the protocol P and an address in the protocol Q, the server unit has translation information necessary for the address translation unit to mutually translate the protocol P and Q; and means for communicating with another server unit to prepare the translation information, and the first address translation unit mutually translates the protocols P and Q by referring to the translation information, and thereafter the second address translation unit mutually translates the protocols Q and P, whereby the network A1 conforming to the protocol P communicates with the network A2 conforming to the protocol P.

An address translation unit for connecting a network conforming to a protocol P and a network conforming to a protocol Q different from the protocol P, comprises:

means for mutually translating the protocols P and Q; means for communicating with a server unit having information necessary for mutual translation of the protocols P and Q; and means, cooperative with the server unit, for preparing translation information including the correspondence relation between an address in the protocol P and an address in the protocol Q; the prepared translation information being referred during the mutual translation of the protocols P and Q.

A server unit in a communication network for connecting a plurality of networks conforming to a protocol P and a network conforming to a protocol Q different from the protocol P by a plurality of address translation units for mutually translating the protocols P and Q, comprises: translation information necessary for mutual translation of the protocols P and Q in the address translation unit; a function of communicating with another server unit to prepare the translation information; and means for requesting the address translation unit to prepare translation information including the correspondence relation between an address in the protocol P and an address in the protocol Q.

It will be further understood by those skilled in the art that the foregoing description has been made on embodiments of the invention and that various changes and modifications may be made in the invention without departing from the spirit of the invention and scope of the appended claims.

What is claimed is:

1. A communication network for connecting a plurality of networks conforming to a first protocol by an address translation unit, wherein the address translation unit mutually translates the first protocol and a second protocol inside the address translation unit, has information and communication means necessary for communication with a server unit, and cooperates with the server unit to prepare and stores translation information containing a correspondence relation between an address in the first protocol and an address in the second protocol, in accordance with information provided by a Domain Name Service-Application Level Gateway (DNS-ALG) unit connected to the address translation unit, the DNS-ALG unit managing the translation information necessary for translation represented by a correspondence relation between the first protocol and the second protocol;

the server unit includes the translation information necessary for mutual translation of the first and second protocols in the address translation unit, an address conforming to the second protocol in correspondence to the network conforming to the first protocol, and communicates with another server unit or another address of the server unit in order to prepare the translation information; and in communication from a first network conforming to the first protocol to a second network conforming to the second protocol, the address translation unit refers to the translation information to translate the address conforming to the first protocol to the address conforming to the second protocol, and to further translate the translated address conforming to the second protocol back to the address conforming to the first protocol.

2. A communication network according to claim 1, wherein the address translation unit identifies the plurality of networks conforming to the first protocol, based on information of a layer two; and when receiving a communication request, the address translation unit specifies a network conforming to the first protocol, based on the information of the layer two to perform translation from the first protocol to the second protocol.

3. A communication network according to claim 1, wherein the plurality of networks conforming to the first protocol are connected to a multiplexing unit, the multiplexing unit and the address translation unit are connected through a plurality of circuits;

the multiplexing unit identifies a network conforming to the first protocol, based on information of a layer two; and when receiving a communication request from the network conforming to the first protocol, the multiplexing unit specifies the network conforming to the first protocol based on the information of the layer two to send a communication request to the address translation unit by using a corresponding circuit.

4. A communication network according to claim 1 wherein the plurality of networks conforming to the first protocol are connected to different address translation units, and each of the address translation units is connected to a network conforming to the second protocol.

5. A communication network according to claim 1, wherein the DNS-ALG unit includes means for rewriting a query made by the server unit and a reply packet to the query.

6. A communication network according to claim 1, wherein one DNS-ALG unit is provided for each Virtual Private Network (VPN) of the plurality of networks conforming to the first protocol.

7. A communication network according to claim 1, wherein the DNS-ALG unit is shared by at least two Virtual Private Networks (VPNs) of the plurality of networks conforming to the first protocol.

8. A communication network according to claim 7, wherein the address translation unit includes means for performing protocol translation by utilizing transport level information.

9. A communication network according to claim 8, wherein the transport level information is represented by MAC addresses, and said VPNs are multiplexed on one physical circuit.

10. A communication network according to claim 8, wherein a prefix is assigned to each of Virtual Private Networks (VPNs) of the plurality of networks conforming to the first protocol in order to constitute the address conforming to the second protocol including both the address conforming to the first protocol and the assigned prefix.

11. An address translation unit for connecting a plurality of networks conforming to a first protocol, comprising:

means for mutually translating the first protocol to a second protocol inside the address translation unit, in accordance with information provided by a Domain Name Service-Application Level Gateway (DNS-ALG) unit connected to the address translation unit, the DNS-ALG unit managing the translation information necessary for translation represented by a correspondence relation between the first protocol and the second protocol;

information and communication means necessary for communication with a server unit; and an address conforming to the second protocol in correspondence to the network conforming to the first protocol, translation information necessary for mutually translating the first and second protocols, and cooperating with another server unit or a server unit which communicates with another address of the server unit for the sake of preparation of translation information in order to prepare translation information containing a correspondence relation between an address in the first protocol and an addresses in the second protocol.

12. An address translation unit according to claim 11 further comprising:

means for identifying the plurality of networks conforming to the first protocol, based on information of a layer two; and means for specifying a network conforming to the first protocol, based on the information of the layer two when receiving a communication request, to perform translation from the first protocol to the second protocol.

13. A communication network for connecting a plurality of networks conforming to a first protocol by an address translation unit, wherein the address translation unit mutually translating the first protocol and a second protocol inside the address translation unit, and having information and communication means necessary for communicating with a server unit;

the communication network comprises:

an address conforming to the second protocol in correspondence to a network conforming to the first protocol, translation information necessary for mutually translating the first and second protocols, and means for communicating with another server unit or another address of the server unit to prepare the translation information; and means for requesting the address translation unit to prepare and store translation information containing a correspondence relation between an address in the first protocol and an address in the second protocol, in accordance with information provided by a Domain Name Service-Application Level Gateway (DNS-ALG) unit connected to the address translation unit, the DNS-ALG unit managing the translation information necessary for translation represented by a correspondence relation between the first protocol and the second protocol.

14. A communication network according to claim 13, wherein the plurality of networks conforming to the first protocol are connected to different address translation units, and each of the address translation units is connected to a network conforming to the second protocol.

15. A server unit in a communication network for connecting a plurality of networks conforming to a first protocol by an address translation unit, wherein the address translation unit mutually translates the first protocol and a second protocol inside the address translation unit, and has information and communication means necessary for communication with a server unit;

the server unit comprises:

translation information necessary for mutually translating the first and second protocols;

means for managing a correspondence relation between identification information of a network, which conforms to the first protocol, and an address, which conforms to the second protocol and is assigned to a server unit belonging to the network conforming to the first protocol, and for communicating with another server unit by referring to the correspondence relation when receiving a name-resolution request of the network conforming to the first protocol; and means for requesting the address translation unit to prepare and store translation information containing a correspondence relation between an address in the first protocol and an address in the second protocol, in accordance with information provided by a Domain Name Service-Application Level Gateway (DNS-ALG) unit connected to the address translation unit, the DNS-ALG unit managing the translation information necessary for translation represented by a correspondence relation between the first protocol and the second protocol.

16. A server unit according to claim 15, wherein the plurality of networks conforming to the first protocol are connected to different address translation units, and each of the address translation units is connected to a network conforming to the second protocol.

17. An address translation method in a communication network for connecting a plurality of networks conforming to a first protocol by an address translation unit, wherein the address translation unit mutually translates the first protocol and a second protocol inside the address translation unit, and has information and communication means necessary for communicating with a server unit, and cooperates with the server unit to prepare translation information containing a correspondence relation between an address in the first protocol and an address in the second protocol, in accordance with information provided by a Domain Name Service-Application Level Gateway (DNS-ALG) unit connected to the address translation unit, the DNS-ALG unit managing the translation information necessary for translation represented by a correspondence relation between the first protocol and the second protocol;

the server unit includes:

translation information necessary for mutually translating the first and second protocols in the address translation unit;

means for communicating with another server unit in order to prepare the translation information when receiving a correspondence relation between identification information of the network, which conforms to the first protocol, and an address which conforms to the second protocol and is assigned to a server unit belonging to the network conforming to the first protocol, and a name-resolution request of the network conforming to the first protocol, by referring to the correspondence relation; and means for requesting the address translation unit to prepare translation information containing a correspondence relation between an address in the first protocol and an address in the second protocol; and in communication from a first network conforming to the first protocol to a second network conforming to the second protocol, the address translation unit refers to the translation information to translate the address conforming to the first protocol to the address conforming to the second protocol, and to further translate the translated address conforming to the second protocol to the address conforming to the first protocol.

18. An address translation method according to claim 17, wherein the plurality of networks conforming to the first protocol are connected to different address translation units, and each of the address translation units is connected to a network conforming to the second protocol.

19. An information network comprising a first network, a second network communicative with the first network, a third network communicative with the second network, a first address translation unit for connecting the first and second networks, and a second address translation unit for connecting the second and third networks, wherein the first address translation unit sends a first temporary address in which an address used in the first network is added with a prefix indicative of the first network, to the second address translation unit through the second network;

the second address translation unit translates the first temporary address to a second temporary address which is an address not used in the third network, to send the second temporary address to the third network; and correspondence information between the first and second temporary addresses is stored.

20. An information network according to claim 19, wherein the second temporary address sent from the third network is translated to the first temporary address based on the correspondence information;

the prefix is deleted from the first temporary address; and a resulting address is sent to the first network.

21. An information network according to claim 20, wherein the first network conforms to a first protocol, and the second and third networks conform to a second protocol.

22. A communication apparatus interposed between first and second networks to intervene in communication between the first and second networks, wherein an original address which is used in the first network and is sent from the first network is received, a first temporary address in which the original address is added with a prefix is formed, and the first temporary address is sent to the second network;

the first temporary address sent from the second network is received, the prefix is deleted from the first temporary address to form the original address, and the original address is sent to the first network, a first address sent from the second network is translated to a second address not used in the first network, and the second address is sent to the first network;

relation between the first and second addresses is held as translation information which is prepared and stored in accordance with information provided by a Domain Name Service-Application Level Gateway (DNS-ALG) unit connected to the address translation unit, the DNS-ALG unit manages the translation information necessary for translation represented by a correspondence relation between the first protocol and the second protocol, the second address sent from the first network is translated to the first address based on the translation information; and the first address is sent to the second network.

* * * * *